(12) United States Patent
Kjeldsen et al.

(10) Patent No.: US 8,066,556 B2
(45) Date of Patent: Nov. 29, 2011

(54) METHOD AND SYSTEM FOR SCALDING SLAUGHTERED POULTRY

(75) Inventors: Poul Kjeldsen, Ebeltoft (DK); Karsten Nielsen, Silkeborg (DK)

(73) Assignee: Linco Food Systems A/S, Trige (DK)

( * ) Notice: Subject to any disclaimer, the term of this patent is extended or adjusted under 35 U.S.C. 154(b) by 954 days.

(21) Appl. No.: 11/574,707

(22) PCT Filed: Sep. 5, 2005

(86) PCT No.: PCT/DK2005/000566
§ 371 (c)(1),
(2), (4) Date: Feb. 19, 2008

(87) PCT Pub. No.: WO2006/024305
PCT Pub. Date: Mar. 9, 2006

(65) Prior Publication Data
US 2009/0042496 A1    Feb. 12, 2009

(30) Foreign Application Priority Data
Sep. 3, 2004 (DK) .................. 2004 01334

(51) Int. Cl.
*A22C 21/04* (2006.01)
(52) U.S. Cl. .......................................... 452/76
(58) Field of Classification Search ........... 452/74–77
See application file for complete search history.

(56) References Cited

U.S. PATENT DOCUMENTS

| | | | |
|---|---|---|---|
| 2,830,318 A | 5/1958 | Zebarth | |
| 3,074,103 A | 1/1963 | Roth et al. | |
| 3,561,040 A | 2/1971 | Folden | |
| 3,703,744 A * | 11/1972 | Dillon | 452/73 |
| 3,729,773 A * | 5/1973 | Dillon | 426/524 |
| 3,744,088 A * | 7/1973 | Snowden | 452/77 |
| 3,748,691 A * | 7/1973 | Snowden | 452/77 |
| 4,196,221 A * | 4/1980 | Dew | 426/235 |
| 4,388,811 A * | 6/1983 | Zebarth | 62/63 |
| 4,852,215 A * | 8/1989 | Covell, III | 452/79 |
| 4,862,557 A * | 9/1989 | Clayton et al. | 99/534 |
| 4,868,950 A * | 9/1989 | Harben, Jr. | 452/77 |
| 4,944,068 A * | 7/1990 | Covell, III | 452/80 |
| 4,947,518 A * | 8/1990 | Covell, III | 452/79 |

(Continued)

FOREIGN PATENT DOCUMENTS
EP    0 297 748 A2    6/1988

(Continued)

*Primary Examiner* — Richard Price, Jr.
(74) *Attorney, Agent, or Firm* — Antonelli, Terry, Stout & Kraus, LLP.

(57) ABSTRACT

A method and apparatus (10) for scalding and plucking slaughtered poultry, by way of example chickens, hens, turkeys, ducks or geese, where the poultry is transported via a sluice device through a scalding tunnel (10) are slaughtering, preferably suspended at the feet, where the poultry in the scalding runnel is conveyed successively between rows of nozzles (36) that are adapted to apply scalding agent to the poultry, where a plurality of different scalding agents are applied, where in a first scalding zone hot water is used as scalding agent, where in succeeding scalding zones scalding agents with mutually differing temperatures are applied, where in the said succeeding scalding zones warm humid air is used as scalding agent which is at least blown onto specific sub areas of the poultry. In a simple way optimal plucking may occur subsequently without the poultry subjected to unnecessary heat action, and so that a considerable reduction of the required energy consumption is simultaneously attained.

18 Claims, 10 Drawing Sheets

U.S. PATENT DOCUMENTS

| | | | | |
|---|---|---|---|---|
| 4,961,248 A * | 10/1990 | Criscione et al. | | 452/79 |
| 4,996,741 A * | 3/1991 | Covell, III | | 452/74 |
| 5,045,021 A * | 9/1991 | Borup | | 452/74 |
| 5,405,289 A * | 4/1995 | Schumann et al. | | 452/71 |
| 5,439,694 A * | 8/1995 | Morris, Jr. | | 426/511 |
| 5,485,332 A * | 1/1996 | Egawa et al. | | 360/234.8 |
| 5,882,253 A * | 3/1999 | Mostoller | | 452/173 |
| 5,899,802 A * | 5/1999 | Burnett | | 452/141 |
| 6,605,308 B2 * | 8/2003 | Shane et al. | | 426/332 |
| 6,733,379 B2 * | 5/2004 | Tsang | | 452/173 |
| 6,749,497 B2 * | 6/2004 | Haley et al. | | 452/167 |
| 6,918,825 B2 * | 7/2005 | Conaway | | 452/88 |
| 7,128,937 B2 * | 10/2006 | van den Nieuwelaar et al. | | 426/332 |
| 7,189,157 B2 * | 3/2007 | Wichelmann | | 452/77 |
| 7,207,879 B2 * | 4/2007 | Kelly et al. | | 452/77 |
| 7,465,223 B2 * | 12/2008 | Zachariassen | | 452/74 |

FOREIGN PATENT DOCUMENTS

| | | |
|---|---|---|
| EP | 1297748 | 6/1988 |
| EP | 0 381 609 | 4/1994 |
| GB | 1075390 | 7/1967 |
| WO | WO 03/088751 A1 | 10/2003 |

* cited by examiner

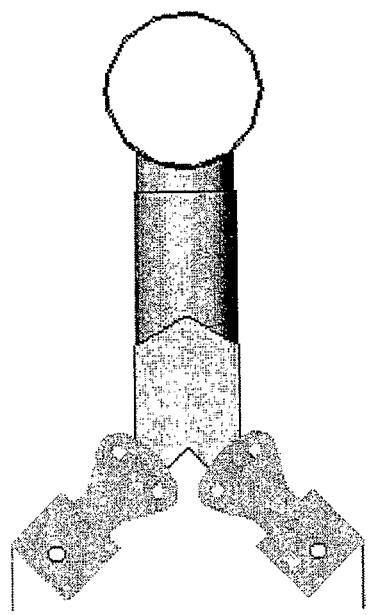
Fig. 10
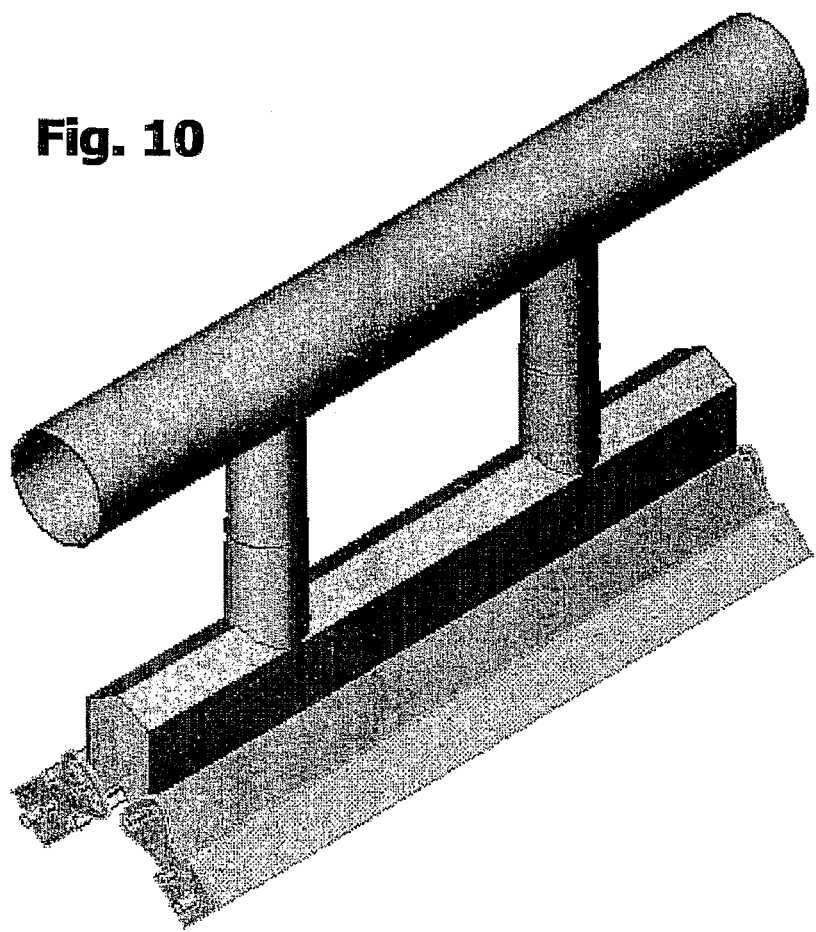

METHOD AND SYSTEM FOR SCALDING SLAUGHTERED POULTRY

BACKGROUND OF THE INVENTION

1. Field of the Invention

The present invention concerns a method for scalding slaughtered poultry, by way of example chickens, turkeys, ducks and geese.

The invention also concerns a system for scalding slaughtered poultry according to the method according to the invention.

2. Description of the Prior Art

In order to scald slaughtered poultry prior to plucking with regard to facilitating the subsequent plucking, it is prior art to convey poultry suspended at the feet through an elongated tank with hot water, possibly combined with injecting air in the scalding vessel through lower nozzles.

By a second prior art method, the poultry is transported successively and suspended at the feet in a conveyor via an inlet sluice through a closed scalding chamber, in which the atmosphere is heated by means of vapor-saturated air which is injected into the chamber and directly upon the poultry. The advantages of applying vapor-saturated air are significant energy savings and a very substantial reduction in dissemination of bacteria, as the poultry are not submerged in a water bath and do not come into direct mutual contact.

Besides, an improved working climate is achieved in the surrounding plucking room as a consequence of a much reduced production of vapor. The poultry is to stay a certain time in the closed scalding chamber, determined by the length and the course of the conveyor belt in the scalding chamber and of its capacity and/or speed. In order to utilize the space in the scalding chamber optimally, the conveyor belt runs in parallel tracks back and forth inside the scalding chamber in the same or at plural levels.

EP-A1-1 297 748 describes a method and an apparatus for scalding poultry where, by means of a primary system of nozzles at the bottom of the scalding chamber, saturated steam is injected which is used for producing humid hot air that is sucked out at the top in the scalding chamber and re-injected directly upon the poultry by means of a secondary system of nozzles. Even if saturated steam is used for heating the scalding air, by this method it is possible anyway to work with a low scalding temperature of about 50° C. or with a higher scalding temperature of about 60° C., as the poultry is not at any time subjected to the direct action of saturated steam.

WO 03/088751 also describes a method and an apparatus for scalding slaughtered poultry before plucking thereof, where the poultry suspended at the feet is transported via a sluice device through a scalding chamber, wherein, by injecting steam into the scalding chamber, there is established a precisely controlled heated atmosphere of humid hot air which is recycled and injected directly onto the poultry, and where the scalding period is determined by the length and the course of the conveyor and of its capacity and/or speed, where a scalding chamber with relatively great height is used, and that the conveyor of the scalding chamber with associated secondary nozzles run through two or more levels (stories).

SUMMARY OF THE INVENTION

The invention is an improved method and system for scalding slaughtered poultry which enables further optimization of the scalding with the intention of achieving subsequent optimal plucking, to avoid unnecessary heat action on the poultry and to attain further reduction of the energy consumption.

The method according to the invention applies different scalding agents, so that in a first scalding zone hot water is used as a scalding agent, and applies in succeeding scalding zones scalding agents with mutually differing temperatures uses in the said succeeding scalding zones warm humid air is used as a scalding agent which is at least blown onto specific sub areas of the poultry. In a simple way is hereby achieved possibility of further optimizing the scalding, so that optimal plucking may occur subsequently without the poultry subjected to unnecessary heat action, and so that a considerable reduction of the required energy consumption is attained simultaneously.

With the purpose of achieving the best possible effect of the humid, hot air, it is of great significance that temperature, pressure and amount of scalding agent are correctly adjusted for scalding the specific sub areas of the poultry, so that softening of follicles and the subsequent plucking of feathers from the said specific sub areas of the poultry are also optimized. It is furthermore advantageous that in a first scalding zone, hot water is used to preheat and flush the feathers of the poultry free from dust and fat, so that the follicles may be softened more efficiently by applying scalding agent in the form of warm humid air in the succeeding scalding zones.

The most difficult sub areas on the poultry are—when speaking of plucking feathers—the tail region and top sides of wings, why these areas are to be applied the greatest amount of scalding agent in the form of warm humid air at the highest temperature. On other sub areas of the poultry, it is considerably easier to pluck off the feathers, i.e. follicles in these sub areas do not require so intensive softening. In other words, very substantial amounts of energy may be saved by controlling and optimizing the supply and the temperature of the scalding agent to respective sub areas of the poultry.

It may be advantageous that the poultry during its passage through the scalding tunnel is turned relative to the direction of conveying, that is so that the wings of the poultry are angularly turned in relation to the direction of transport. Hereby may be achieved that the poultry may hang closer without the wings coming into mutual contact. In other words, the capacity of a scalding tunnel may be increased by angular turning of the wings of the poultry, as the mutual hanger spacing may be reduced thereby. In this connection it is important to point out that due to risk of infection, individual poultry must not come into direct contact with other poultry during the passage of the scalding tunnel.

The method according to invention is suitably further modified in that the poultry is then conveyed between additional rows of nozzles blowing warm humid air at least on the remaining sub areas of the poultry. In a simple way is hereby achieved that the sub areas of the poultry, which are the most easy to pluck the feathers from, are also treated most gently by minimizing the harmful heat action on respective sub areas of the poultry.

The method according to the invention is most suitably further modified in that after passing through the first-mentioned row of nozzles, the poultry is passed through a primary plucking station, where feathers are plucked from the first-mentioned specific sub-areas of the poultry, and that the poultry, after passing through the additional rows of nozzles, is passed through a secondary plucking station where the remaining feathers are plucked from the poultry.

The invention also concerns an apparatus for use in the method according to the invention and including a largely closed scalding tunnel with a conveyor that runs past a system of nozzles which are arranged to apply scalding agent on the poultry, the scalding tunnel including a first scalding zone with rows of nozzles that spray hot water on the poultry, and succeeding scalding zones which work with a scalding agent of different temperatures, and which include a system of nozzles arranged for blowing warm humid air on specific sub areas of the poultry.

The apparatus according to the invention provides the scalding agent with a temperature in a first of succeeding scalding zones of about 60° C., and with a temperature of the scalding agent in a second of the succeeding scalding zones of about 50° C.

With the intention of minimizing the required heat action on the poultry and for the best possible utilization of the gentle, though purposeful softening of the specific sub areas of the poultry, the apparatus according to the invention may advantageously be designed so that after the first of the succeeding scalding zones, a first plucking station is provided which plucks feathers from the first-mentioned specific sub areas of the poultry.

With the purpose of optimizing also the plucking of feathers from the remaining sub areas of the poultry, the apparatus according to the invention may advantageously be designed so that after the second of the said succeeding scalding zones, a second plucking station is provides which plucks the remaining feathers from the poultry.

With the intention of optimizing supply of the scalding agent to specific sub areas of the poultry, the apparatus according to the invention may suitably be designed so that the system of nozzles includes movable and individually controllable nozzles which follow the poultry at least over a sub-distance of the scalding zones.

The apparatus according to the invention may furthermore advantageously be designed so that the movable nozzles are designed in elongated cylindrical drums that are rotated about a horizontal axis, so that preferably helical discharge openings of the nozzles are moved along the poultry in a direction of conveying of the latter.

The apparatus according to the invention may furthermore be designed so that the individually controllable nozzles are in elongated cylindrical drums which are rotated about an inclining axis, so that preferably helical discharge openings of the nozzles of the drum are moved in a vertical direction as well as in a horizontal direction relative to the direction of conveying of the poultry.

BRIEF DESCRIPTION OF THE DRAWINGS

The invention is explained more closely in the following with reference to the drawing, on which:

FIG. 10 shows two views of an alternative embodiment of elongated pivotable slotted nozzles for controlled application of scalding agent to specific sub areas of the poultry, for example the tail region, during its passage through a scalding tunnel according to the invention.

DETAILED DESCRIPTION OF THE INVENTION

Figure 1:
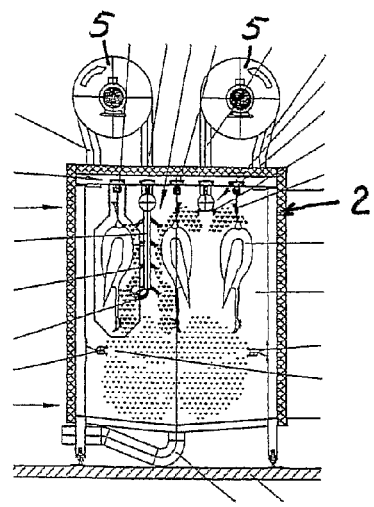
FIG. 1 shows a vertical section through a scalding chamber known from the above mentioned EP-A1-1 297 748.
Figure 2:
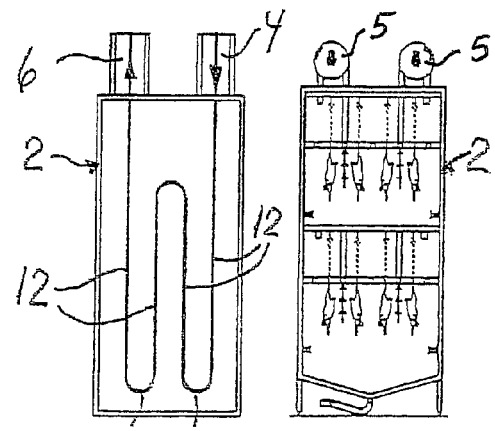
FIG. 2 shows a horizontal side view and a vertical section through a second scalding chamber known from the above mentioned WO 03/088751.
Figure 3:
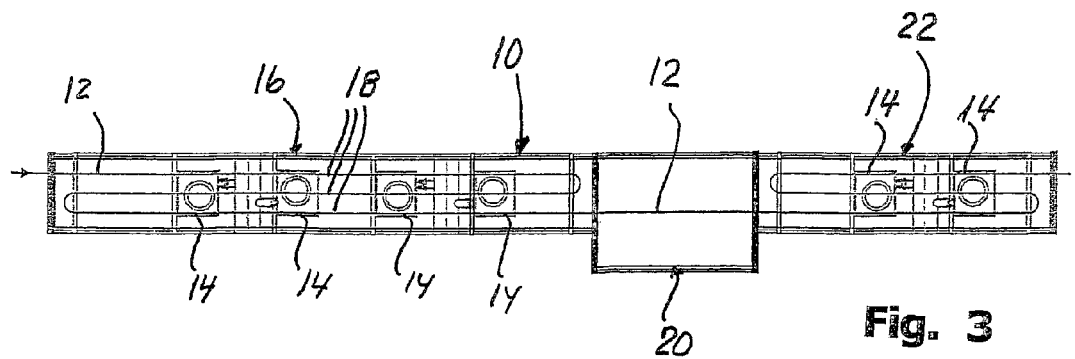
FIG. 3 shows a longitudinal section through an embodiment of a scalding tunnel according to the invention.
Figure 4:
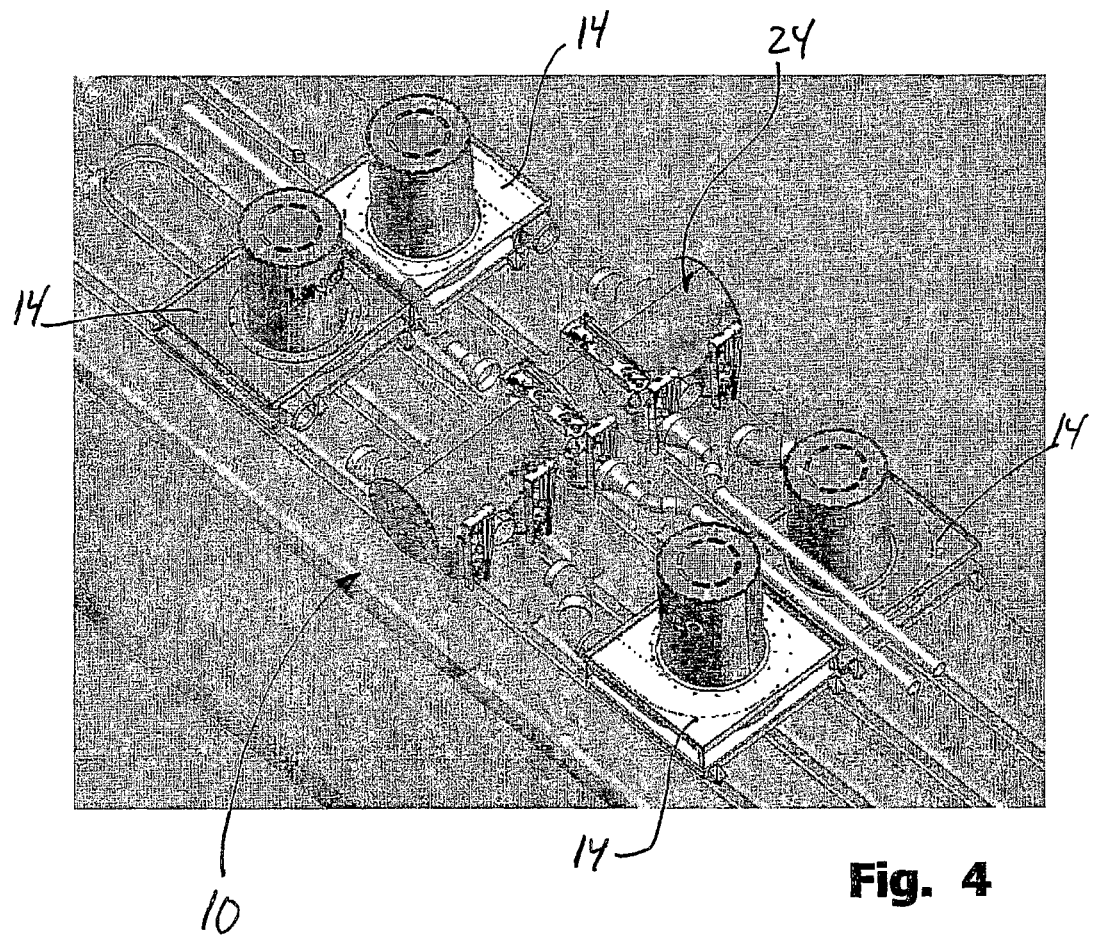
FIG. 4 shows a perspective view of an embodiment of a blower arrangement with a common manifold for distributing the humid warm scalding air to several nozzle sections of a scalding tunnel according to the invention.

The apparatus or scalding tunnel 10 according to the invention includes, as it appears from FIGS. 3 and 4, centrifugal blowers 14 which are built into the ceiling of the scalding tunnel 10, that is which have horizontal ventilator wings driven by vertically disposed motors 16, which is different from the prior art scalding chambers or scalding tunnels 2 shown in FIGS. 1 and 2, where centrifugal blowers 5 are mounted separately upon the scalding chamber or the scalding tunnel 2.

The apparatus or the scalding tunnel 10 according to the invention also uses the same heating principle for the scalding agent, which is shown in FIGS. 1 and 2, as the scalding means in the form of warm humid air is produced by injecting vapor-saturated steam in a lower part of the scalding tunnel 10 by means of a primary system of nozzles. Subsequently, the warm humid scalding air is evacuated by means of the centrifugal blowers 14 which then re-inject the scalding air directly onto the poultry which passes through the scalding tunnel 10 suspended by the legs by means of hangers in a conveyor track 12.

The conveyor 12 runs through a first scalding section 16 of the scalding tunnel 10 shown in FIG. 3 in three mutually parallel tracks 18 that run between a system of nozzles arranged to blow warm humid air directly on specific sub areas of the poultry before it is conveyed through a primary plucking station 20, where feathers are plucked off from at least the said specific sub areas of the poultry. These sub areas may, for example, be the tail region of the poultry and top sides of wings, where follicles are most difficult to soften with the object of mechanized plucking of feathers. Then the poultry is continued on the conveyor track 12 through a second scalding section 22 in which the poultry, also in mutually parallel tracks, pass between a second system of nozzles which are arranged to blow warm humid air on the remaining parts of the poultry, which then passes yet a plucking station (not shown) where the remaining feathers are plucked by machine.

FIG. 4 shows how the centrifugal blowers 14 are built into the ceiling of the scalding tunnel 10, and how four centrifugal blowers 14 via a common manifold 24 supply a very large number of not shown injection nozzles.

Figure 5:
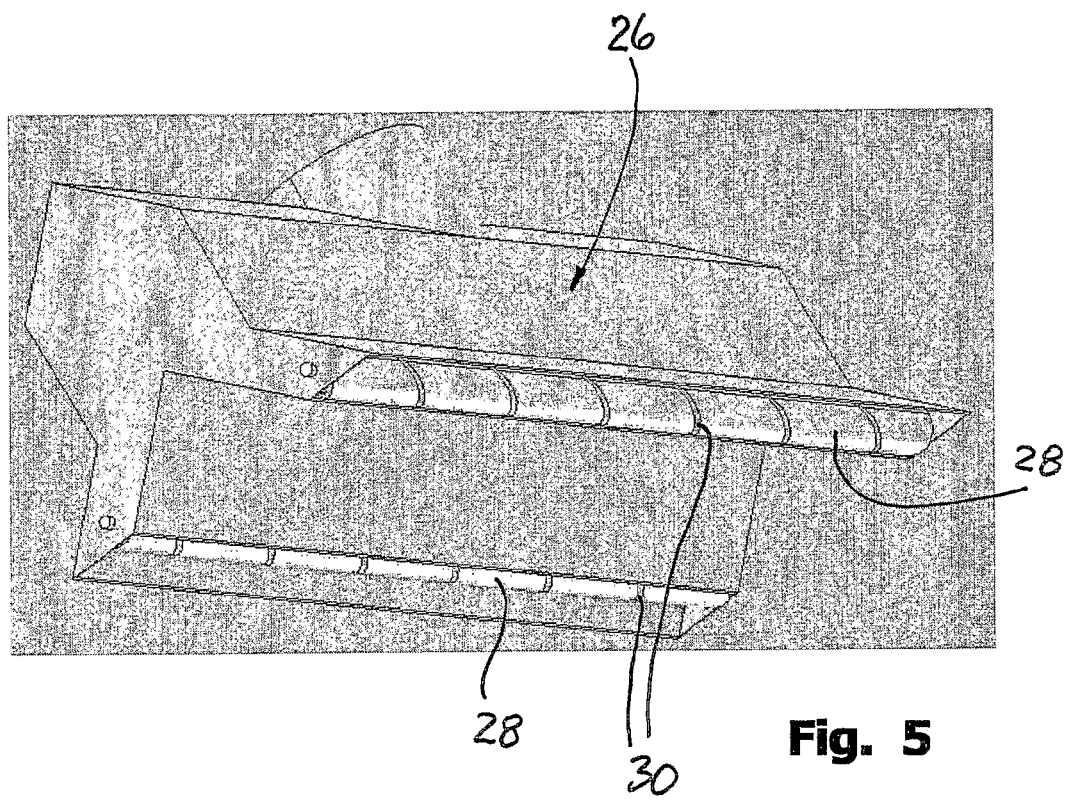
FIG. 5 shows a perspective view of an embodiment of a nozzle arrangement with two rotating elongated helical discharge or nozzle opening according to the invention.

FIG. 5 shows an embodiment of a special nozzle arrangement 26 with two rotating elongated cylindrical drums 28 with helical discharge or nozzle openings 30. According to need, the nozzle arrangement 26 may be mounted horizontally in relation to the direction of movement of the poultry through the scalding tunnel 10, that is so that the discharge or nozzle openings 30 follow the poultry by rotating the drums 28 and blows scalding agent upon the poultry over a length determined by the length of the nozzle arrangement 26.

Alternatively, the nozzle arrangement 26 may be mounted at an oblique angle in relation to the vertical or the horizontal so that the nozzle opening 30 may be moved both in horizontal and in vertical direction compared with the direction of movement of the poultry during its passage past the nozzle arrangement 26.

Figure 6:
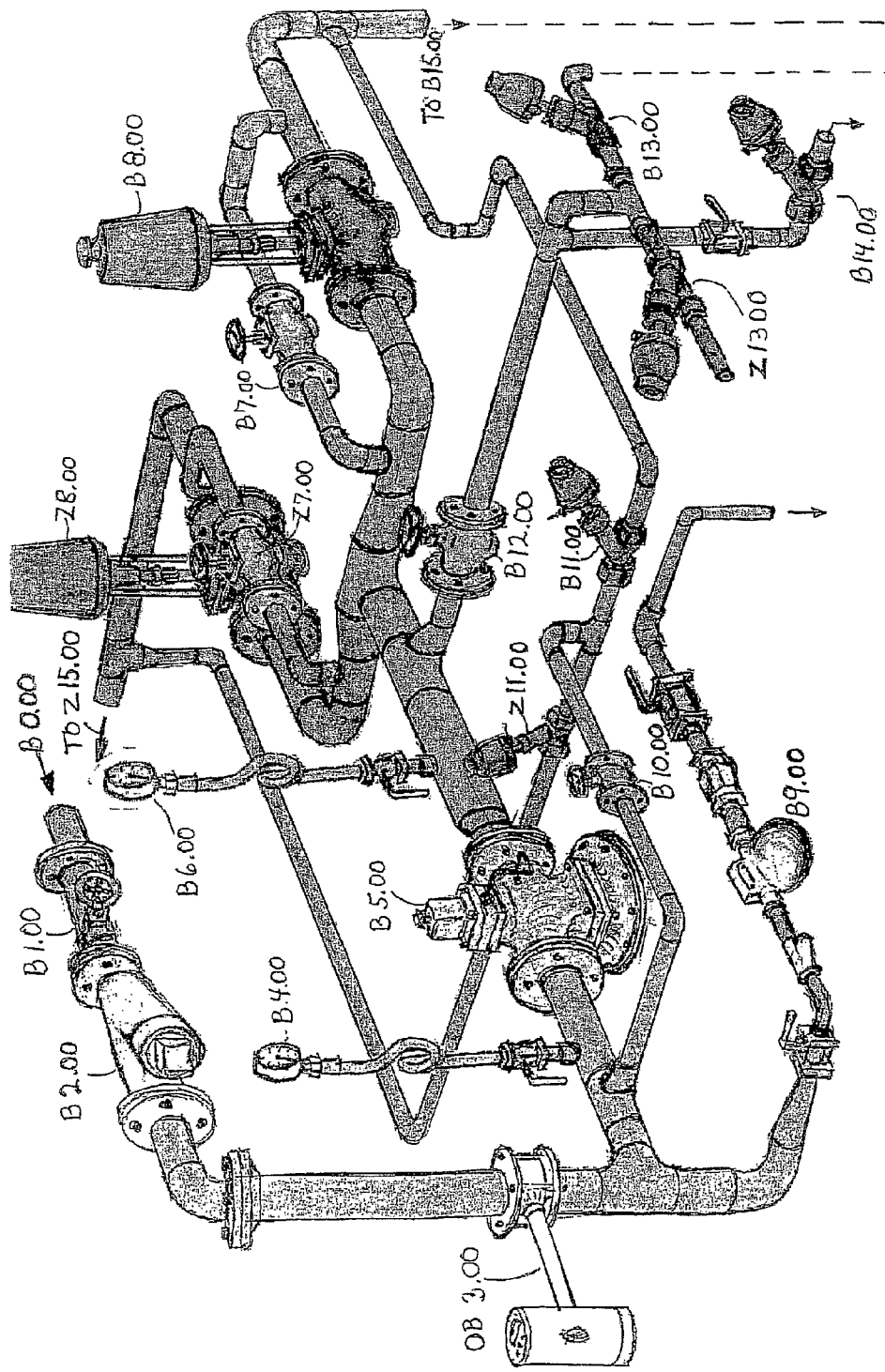
FIG. 6 shows an embodiment of a flow diagram of a primary steam system by a scalding tunnel according of the invention.
Figure 7:
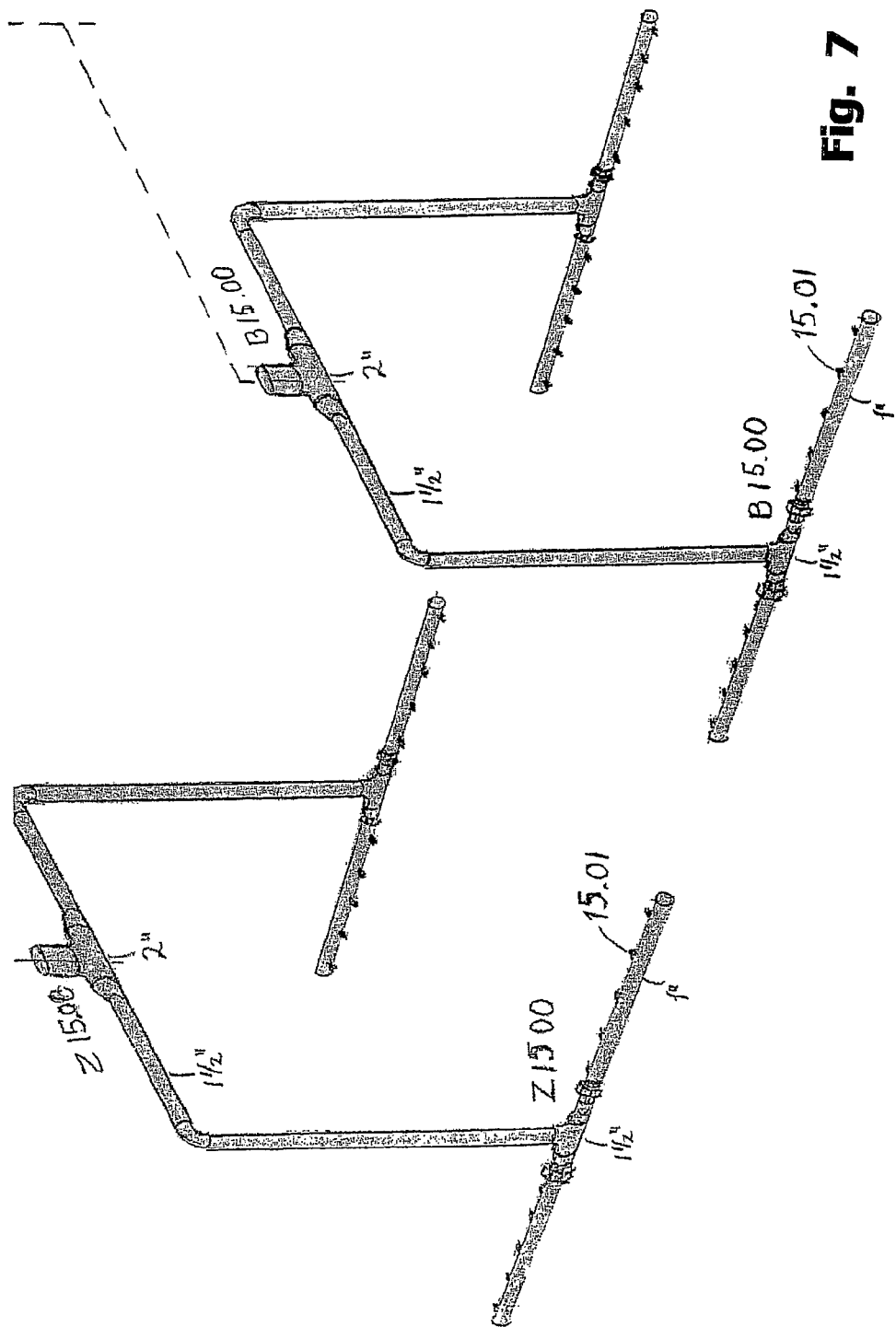
FIG. 7 shows an embodiment of a flow diagram for a secondary steam system according to the invention.

FIG. 6 shows a flow diagram for the primary steam system, where steam is let in at B0.00 and passes a filter B2.00, a flowmeter (steam volume) OB3.00. Downwards, a condensate separator B9.00 is arranged. The primary steam flow passes a pressure control valve B5.00, where after the steam is divided into two main streams with each their motor-operated valve B8.00/Z8.00, from where the steam is conducted to each their nozzle group B15.00/Z15.00 which is also shown in FIG. 7. Between the pressure control valve B5.00 and a T-branch to the motor-operated valve B8.00/Z8.00 there is provided a branch from the primary steam flow, so that high-pressure steam may be conducted to respective tunnel sections with the purpose of controlling the temperature of the scalding agent via branches B13.00/Z13.00, as well as steam may be drawn off via a separate branch B14.00 for optional separate scalding of the feet of the poultry.

Figure 8:
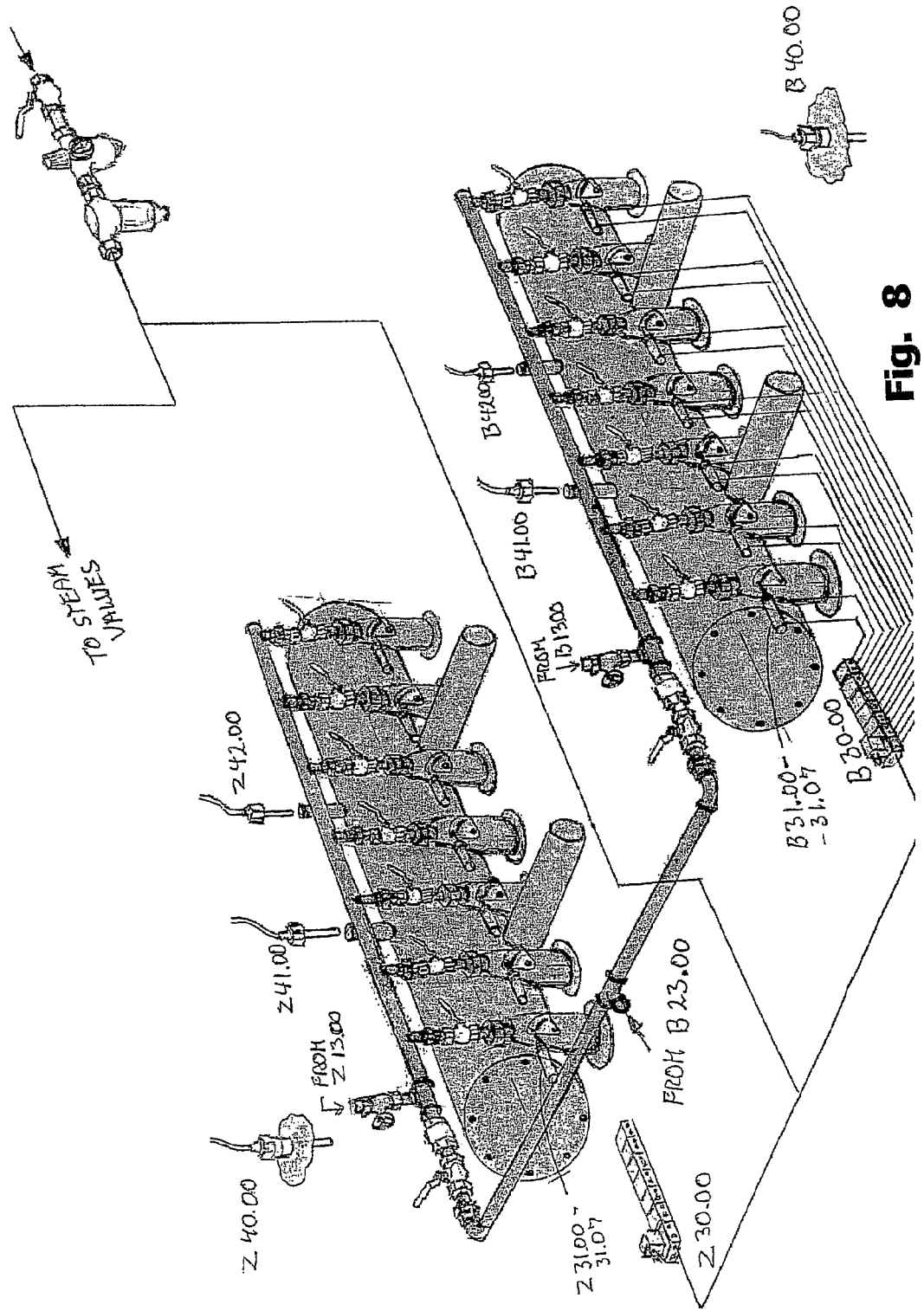
FIG. 8 shows an embodiment of a flow diagram of a manifold system for controlling and distributing the scalding means in the form of humid warm air for a scalding tunnel according to the invention.

FIG. 8 shows a flow diagram for two manifold systems for distributing controlled scalding agent in the form of warm humid air to each their section B and Z of scalding tunnel 10, where admixing of extra water via the valve groups B25.00/Z25.00 (FIG. 9) and each their hose branch may be effected directly down into the tangentially arranged discharge pipes which are directly connected with the injecting nozzles, and which each additionally comprise the motor-operated valves B31.00-31.07/Z31.00-31.07 that are each controlled via control wires from common terminal strips B30.00/Z30.00 (only the control wires from terminal strip B30.00 to B31.00-31.07 are shown at the bottom of FIG. 8).

B40.00/Z40.00 are temperature sensors that measure the temperature in respective sections of scalding tunnel 10. B41.00/Z41.00 are temperature sensors showing the actual temperatures of scalding agent, while B42.00/Z42.00 are humidity sensors showing the actual humidity of the scalding agent.

Figure 9:
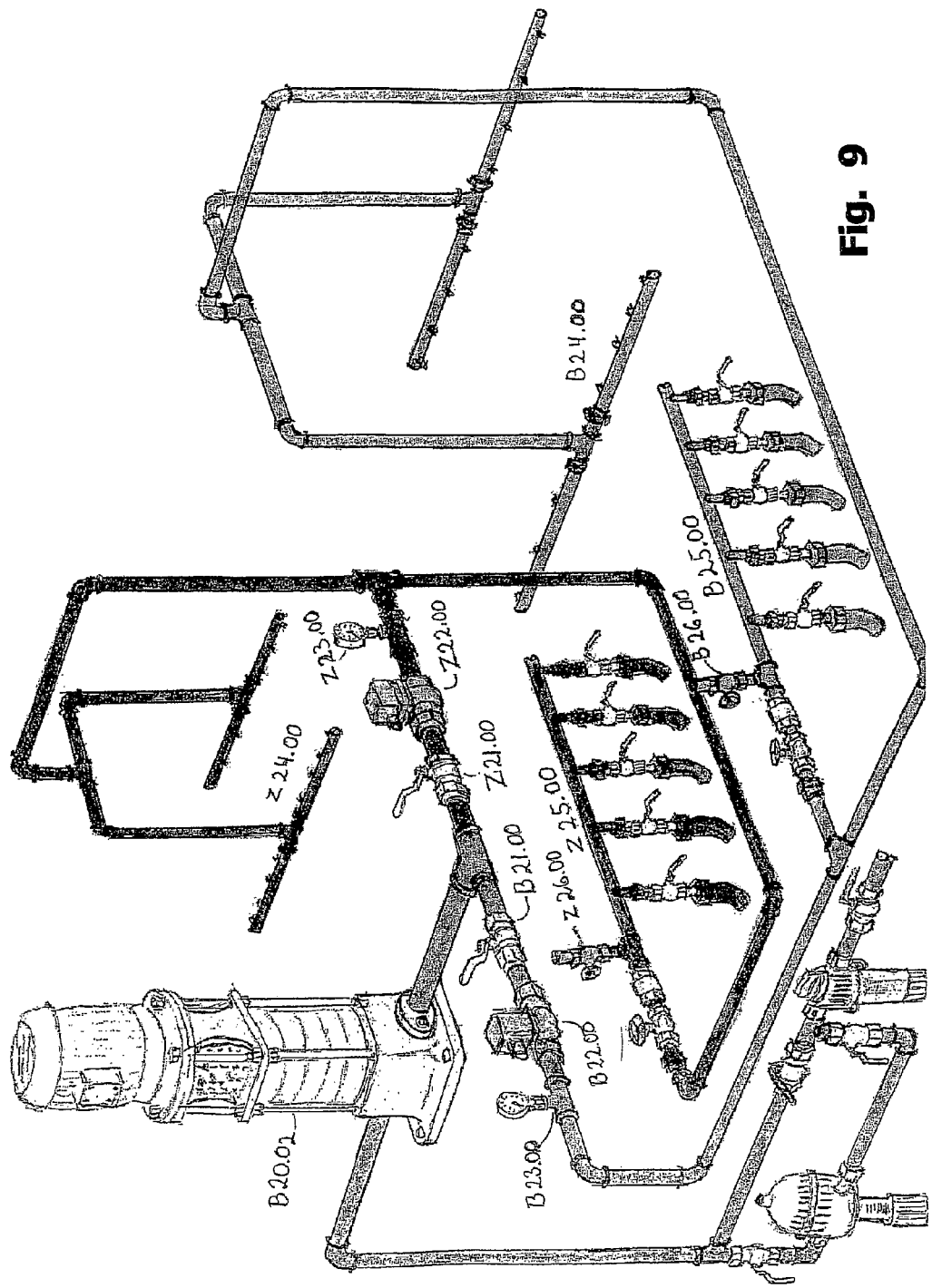
FIG. 9 shows an embodiment of a flow diagram for a primary and a secondary water distributing system for a scalding tunnel according to the invention.

FIG. 9 shows an embodiment of a flow diagram of a primary and secondary water distribution system, where B20.02 is a water pump supplying water at 4-8 bar, where B22.00/Z22.00 are solenoid valves for each their group B24.00/Z24.00 of water atomising nozzles for respective sections of scalding tunnel 10. The water atomizing nozzles are disposed on the tunnel wall above the steam nozzles and serve to regulate the actual humidity of the warm scalding air.

FIG. 10 shows two views of an alternative embodiment of elongated pivotable slotted nozzles for controlled supply of scalding agent to specific sub areas of the poultry, for example its tail region, during its passage through a scalding tunnel according to the invention.

Figure 11:
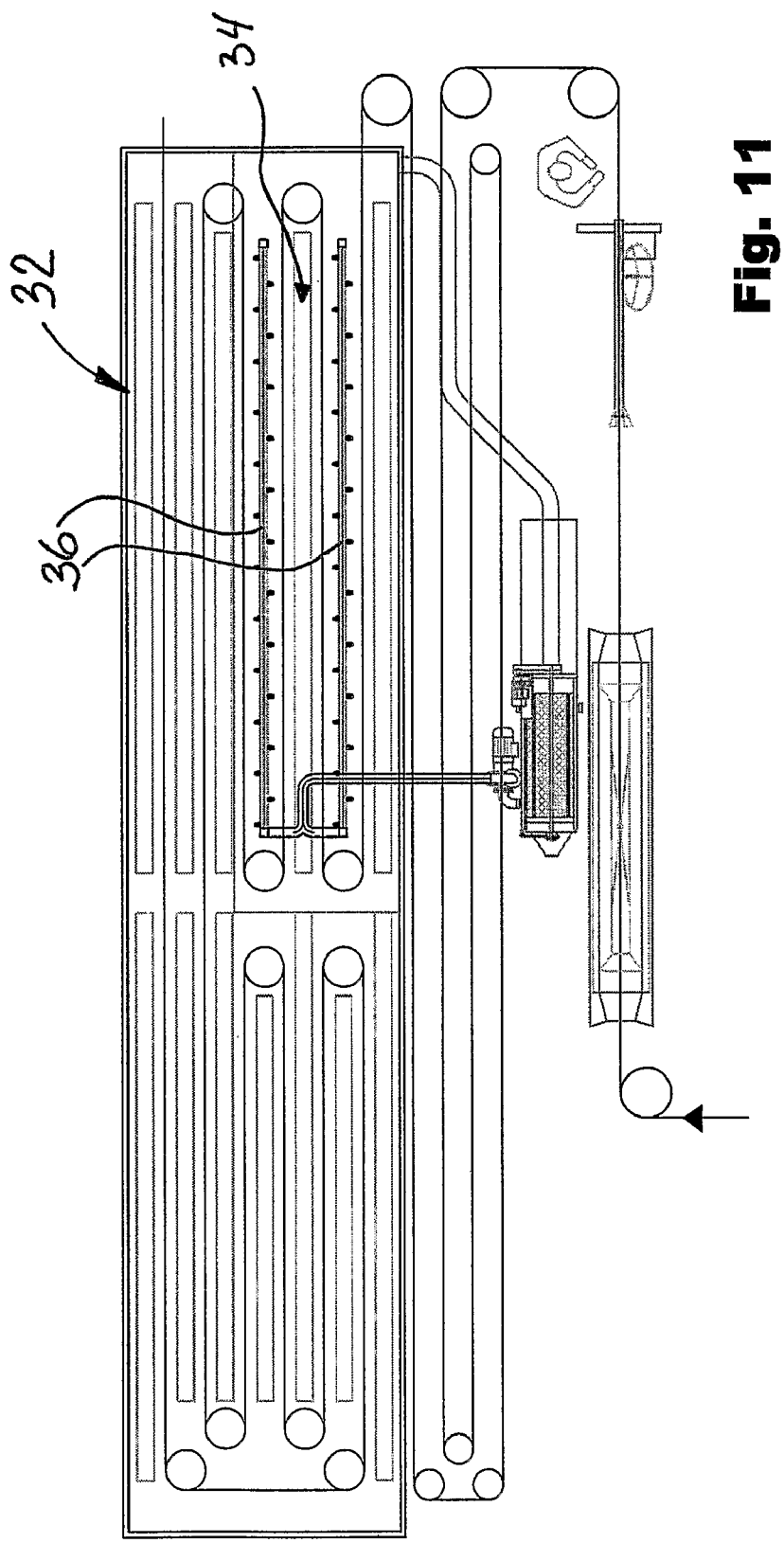
FIG. 11 shows a horizontal section through a preferred embodiment of a scalding tunnel according to the invention.
Figure 12:
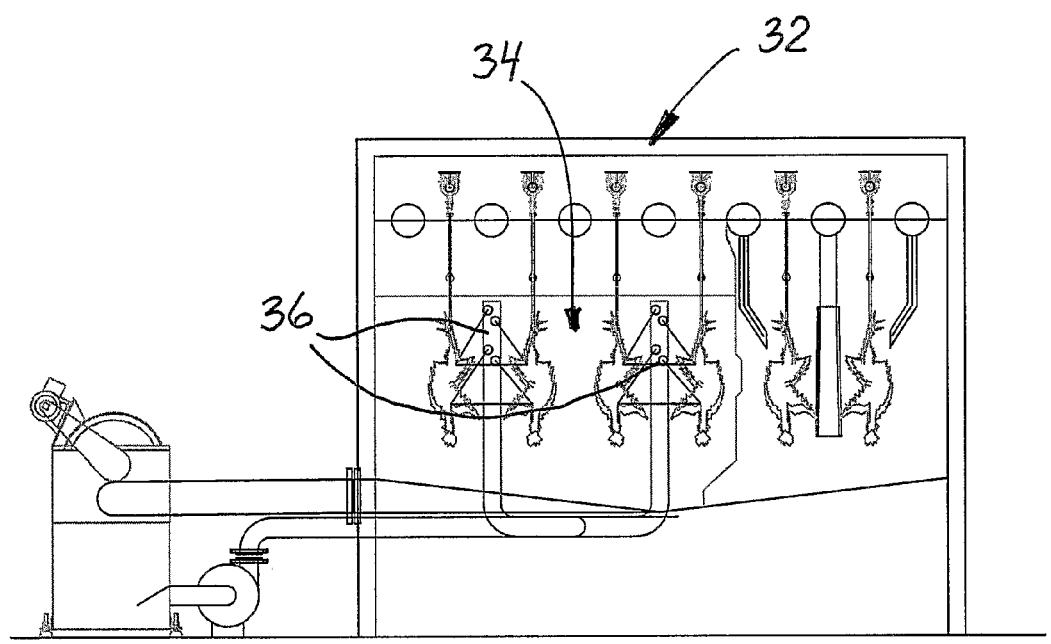
FIG. 12 shows a vertical section through the preferred scalding tunnel shown in FIG. 11.

The preferred embodiment of a scalding tunnel 32 shown in FIGS. 11 and 12 includes a first scalding zone 34 provided with a system of nozzles 36 which is adapted to spray hot water (52-60° C.) on the poultry with the intention of preheating and flushing the plumage free from dust and fat so that the softening of the follicles of the poultry becomes more efficient in the succeeding scalding zones, where warm humid air is used for softening follicles of specific sub areas of the poultry.

With the intention of optimizing energy saving, the warm flushing water is collected at the bottom of the scalding tunnel 32, so that it may be reused together with the condensate from the subsequent nozzles supplying warm humid air on specific sub areas of the poultry.

In that connection, it is important to point out that no risk of infection occurs by using and reusing warm water for spraying on the poultry, as this occurs before the plucking, that is before follicles are exposed.

The invention claimed is:

1. An apparatus comprising a scalding tunnel for scalding slaughtered poultry including a conveyor located therein running past a system of nozzles for applying a scalding agent to the poultry, the tunnel including a first scalding zone with rows of nozzles for spraying hot water on the poultry, succeeding scalding zones for applying a scalding agent having mutually different temperatures to the poultry, and nozzles for blowing warm humid air on specific sub areas of the poultry; and wherein a temperature of the scalding agent in a first of the succeeding scalding zones is about 60° C., and a temperature of the scalding agent in a second of the succeeding scalding zones is about 50° C. and the first of the succeeding scalding zones includes a first plucking station for plucking feathers from the specific sub areas of the poultry.

2. An apparatus according to claim 1, wherein a second of the succeeding scalding zones includes a second plucking station for plucking remaining feathers from the poultry.

3. An apparatus according to claim 2 wherein nozzles in the succeeding scalding zones include movable and individually controllable nozzles which follow the poultry at least over a part of the scalding zones.

4. An apparatus according to claim 3, wherein the movable and individually controllable nozzles comprise elongated cylindrical drums with discharge openings that are rotated about a horizontal axis, so that the discharge openings of the nozzles are moved along the poultry in the direction of conveying of the poultry.

5. An apparatus in accordance with claim 4 wherein the hot water in the first scalding zone preheats and flushes feathers of the slaughtered poultry.

6. An apparatus according to claim 3, wherein the movable and individually controllable nozzles comprise elongated cylindrical drums with discharge openings which are rotated about an inclining axis, so that the discharge openings of the nozzles are moved in vertical direction as well as in horizontal direction relative to the direction of conveying of the poultry.

7. An apparatus in accordance with claim 6 wherein the hot water in the first scalding zone preheats and flushes feathers of the slaughtered poultry.

8. An apparatus in accordance with claim 3 wherein the hot water in the first scalding zone preheats and flushes feathers of the slaughtered poultry.

9. An apparatus in accordance with claim 2 wherein the hot water in the first scalding zone preheats and flushes feathers of the slaughtered poultry.

10. An apparatus according to claim 1, wherein the succeeding scalding zones include movable and individually controllable nozzles which follow the poultry at least over a part of the scalding zones.

11. An apparatus according to claim 10, wherein the movable and individually controllable nozzles comprise elongated cylindrical drums with discharge openings that are rotated about a horizontal axis, so that the discharge openings of the nozzles are moved along the poultry in the direction of conveying of the poultry.

12. An apparatus in accordance with claim 11 wherein the hot water in the first scalding zone preheats and flushes feathers of the slaughtered poultry.

13. An apparatus according to claim 10, wherein the movable and individually controllable nozzles comprise elongated cylindrical drums with discharge openings which are rotated about an inclining axis, so that the discharge openings of the nozzles are moved in vertical direction as well as in horizontal direction relative to the direction of conveying of the poultry.

14. An apparatus in accordance with claim 13 wherein the hot water in the first scalding zone preheats and flushes feathers of the slaughtered poultry.

15. An apparatus in accordance with claim 10 wherein the hot water in the first scalding zone preheats and flushes feathers of the slaughtered poultry.

16. An apparatus in accordance with claim 1 wherein the hot water in the first scalding zone preheats and flushes feathers of the slaughtered poultry.

17. An apparatus comprising a scalding tunnel for scalding slaughtered poultry including a conveyor located therein running past a system of nozzles for applying a scalding agent to the poultry, the tunnel including a first scalding zone with rows of nozzles for spraying hot water on the poultry, succeeding scalding zones for applying a scalding agent having mutually different temperatures to the poultry, and nozzles for blowing warm humid air on specific sub areas of the poultry; and wherein
  a first of the succeeding scalding zones includes a first plucking station for plucking feathers from the specific sub areas of the poultry.

18. An apparatus in accordance with claim 17 wherein the hot water in the first scalding zone preheats and flushes feathers of the slaughtered poultry.

\* \* \* \* \*